(12) United States Patent
Demir

(10) Patent No.: US 12,281,239 B2
(45) Date of Patent: *Apr. 22, 2025

(54) ANTIMICROBIAL ADDITIVE COMPOSITIONS FOR COATINGS

(71) Applicant: PEGASUS ENVIRONMENTAL RESEARCH AND INVESTMENT GROUP LLC, Tampa, FL (US)

(72) Inventor: Okan Demir, Istanbul (TR)

(73) Assignee: PEGASUS ENVIRONMENTAL RESEARCH AND INVESTMENT GROUP LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,515

(22) Filed: Feb. 15, 2024

(65) Prior Publication Data

US 2024/0301217 A1    Sep. 12, 2024

Related U.S. Application Data

(63) Continuation of application No. 17/193,521, filed on Mar. 5, 2021, now Pat. No. 11,905,435.

(60) Provisional application No. 62/986,950, filed on Mar. 9, 2020.

(51) Int. Cl.
| | |
|---|---|
| C09D 5/14 | (2006.01) |
| C08K 3/015 | (2018.01) |
| C08K 3/38 | (2006.01) |
| C08K 5/00 | (2006.01) |
| C08K 5/19 | (2006.01) |
| C09D 5/16 | (2006.01) |

(52) U.S. Cl.
CPC ............... *C09D 5/14* (2013.01); *C08K 3/015* (2018.01); *C08K 3/38* (2013.01); *C08K 5/0058* (2013.01); *C08K 5/0091* (2013.01); *C08K 5/19* (2013.01); *C09D 5/16* (2013.01); *C09D 5/1606* (2013.01); *C09D 5/1612* (2013.01); *C09D 5/1618* (2013.01); *C09D 5/1625* (2013.01); *C09D 5/1687* (2013.01); *C08K 2003/387* (2013.01)

(58) Field of Classification Search
CPC .......... C09D 5/14; C09D 5/16; C09D 5/1606; C09D 5/1612; C09D 5/1618; C09D 5/1625; C09D 5/1687

See application file for complete search history.

(56) References Cited

U.S. PATENT DOCUMENTS

| | | | |
|---|---|---|---|
| 6,750,276 B2 | 6/2004 | Ruggiero et al. | |
| 9,763,453 B2 | 9/2017 | Cook et al. | |
| 11,123,432 B2 | 9/2021 | Sahin et al. | |
| 11,905,435 B2 * | 2/2024 | Demir | C08K 5/19 |
| 2008/0118734 A1 | 5/2008 | Goodwin et al. | |
| 2018/0244895 A1 | 8/2018 | Iyigundogdu et al. | |
| 2018/0296737 A1 | 10/2018 | Sivakumaran et al. | |
| 2020/0100995 A1 | 4/2020 | Sangirardi et al. | |

FOREIGN PATENT DOCUMENTS

| | | |
|---|---|---|
| ES | 2426216 T3 | 10/2013 |
| WO | 2019115172 A1 | 6/2019 |

* cited by examiner

*Primary Examiner* — Vickey Nerangis

(74) *Attorney, Agent, or Firm* — Shumaker, Loop & Kendrick, LLP

(57) ABSTRACT

An antimicrobial formulation that can be directly added into a composition or onto a surface of a composition (e.g., forming a surface coating on a composition or device). The antimicrobial formulation includes sodium pentaborate, disodium tetraborate decahydrate, titanium diboride, titanium borate, sodium pyrithione, zinc pyrithione, benzhetonium chloride, or any combination thereof.

12 Claims, 18 Drawing Sheets

ANTIMICROBIAL ADDITIVE COMPOSITIONS FOR COATINGS

TECHNICAL FIELD

The present invention relates generally to the field of antimicrobial compositions, and more particularly, to antimicrobial additive compositions for coatings, which preferably include within paint(s) and/or being applied to surfaces as surface coatings.

BACKGROUND

Microbial (e.g., bacterial and/or fungal) growth on a substrate and/or within coatings can often be attributed to specific physical and chemical environmental features, which include endogenous nutrients found within the substrate, humidity of and/or surrounding the substrate, and/or presences or lack of oxygen.

To thrive within the above mentioned environments (e.g., coatings), microorganisms need, for example, water, nitrogen, vitamins, and minerals in order for growth and reproduction to occur. However, it should be further noted that microorganisms can survive within these environments (e.g., within coatings) even in the absence of water (humidity), nitrogen, vitamins, and minerals by often becoming dormant (and/or sporulating) and/or without further reproducing until the environment becomes more favorable. In particular, surface bound microorganism's growth is related to the coating/material's humidity capacity and accessibility to humidity. In addition to humidity, organic and inorganic molecules availability within these environments/coatings can be further attributed to microbial growth and/or survival over long time periods.

Biocides (often divided into fungicides and biocides) are protective substances that reduce and/or prevent bacteria, mold, alga, and fungus growth, and are typically included within the above mentioned coatings. These biocides can typically inhibit microbiological spoilage and minimize cross contamination risk in materials in which they are added [1].

Coating materials are used to cover substance's surfaces either decoratively or functionally. Over time, coating producers/manufacturers began studying coating materials intensely and developed a wide range of coating materials associated with the change of consumer hygiene perspectives and in view of the increased demand [2].

For example, it is mentioned in the patent number ES2426216T3 assigned to BASF Corporation that silver and silver based zeolite can be mixed into glass polymer(s) or surface coating material(s) to increase antimicrobial activity [3].

In U.S. Pat. No. 9,763,453B2, it is disclosed that medical devices were covered by a sulfadiazine based ingredient, which resulted in increased antimicrobial activity [4].

In the literature, there are also several studies regarding antimicrobial activity of boron compounds. For example, Bailey et al. discloses that boric acid has antibacterial effects on enteric bacteria. Antibacterial agents including boron were applied on gram negative bacteria (*E. coli* and *P. Mirabilis*), and it was further observed that boron/boron based compounds were effective in limiting gram negative bacteria viability and growth [5].

Imokawa et al. disclosed that zinc pyrithione has an antifungal effects on *Pityrosporum ovale* [6], and Reeder et al. further observed that zinc pyrithione has an anti-yeast effect on *Saccharomyces cerevisiae* yeast [7].

SUMMARY

Although certain additives are known to provide antimicrobial activity to both functional and decorative surface coatings, there is a need to provide additional antimicrobial additive formulations (also referred to as antimicrobial formulation or formulation) that are easily and advantageously mixed within these coating materials and/or that are easily applied as surface coatings that further impart improved, prolonged antimicrobial activity. In particular, disclosed herein are additive formulation(s) that include boron containing compounds (and/or zinc containing compounds and/or chlorine containing compounds) that can be easily added directly into coating materials and/or easily mixed with paint or other coating materials. In certain aspects and as further disclosed herein, these formulations can be further used as surface coatings on compositions and/or devices to further impart antimicrobial activity, anti-viral activity, anti-fungal activity, or any combination thereof. These additive formulations that include boron compounds are preferably chosen from sodium pentaborate ($Na_2B_{10}O_{16} \cdot 10H_2O$), di-sodium tetraborate decahydrate ($Na_2B_4O_7 \cdot 10H_2O$), titanium diboride ($TiB_2$), titanium borate ($B_4O_{12}Ti_3$), sodium pyrithione ($C_5H_4NNaOS$), zinc pyrithione ($C_{10}H_8N_2O_2S_2Zn$), benzhetonium chloride ($C_{27}H_{42}ClNO_2$), or any combination thereof.

In certain aspects, the additive formulations disclosed herein can be added into paint or a similar surface coating to produce an antifungal paint or similar surface coating material having antifungal activity, an antibacterial paint or similar surface coating material having antibacterial activity, or any combination thereof. These additive formulations may be added into the paint and/or similar surface coating materials either during production or post-production of the paint and/or similar surface coating materials.

In certain aspects, the disclosed antimicrobial additive formulations also advantageously reduce and/or prevent biological degradation and/or contamination of the coating materials, thus advantageously resulting in increased lifespan and durability of these coatings/coating materials.

In certain aspects, these additive formulations also advantageously control pathogenic microorganisms causing allergies and/or infections originated by surfaces and prevent illnesses.

In certain aspects, these additive formulations may also reduce and/or inhibit biological corrosion and/or spoilage of the coatings/coating materials disclosed herein.

In certain aspects, disclosed is an antimicrobial formulation that can be directly added into a composition or onto a surface of a composition as a surface coating, the antimicrobial formulation comprising sodium pentaborate, di-sodium tetraborate decahydrate, titanium diborite, titanium borate, sodium pyrithione, zinc pyrithione, benzhetonium chloride, or any combination thereof.

In certain aspects, the formulation comprises sodium pentaborate at a concentration ranging from 1 wt % to 20 wt % of an overall composition. In certain aspects, sodium pentaborate is present at a concentration ranging from 3 wt % to 12 wt % of an overall composition, and more preferably from 5 wt % to 10 wt % of the overall composition.

In certain aspects, the formulation comprises sodium di-sodium tetraborate decahydrate at a concentration ranging from 1 wt % to 20 wt % of an overall composition. In certain aspects, sodium di-sodium tetraborate decahydrate is present at a concentration ranging from 3 wt % to 12 wt % of an overall composition, and more preferably from 5 wt % to 6 wt % of the overall composition.

In certain aspects, the formulation comprises titanium diborite at a concentration ranging from 0.2 wt % to 20 wt % of an overall composition.

In certain aspects, the formulation comprises titanium borate at a concentration ranging from 0.2 wt % to 20 wt % of an overall composition.

In certain aspects, the formulation comprises zinc pyrithione at a concentration ranging from 0.005 wt % to 10 wt % of an overall composition. In certain aspects, the zinc pyrithione is at a concentration ranging from 0.1 wt % to 3.5 wt % of an overall composition, and more preferably at a concentration ranging from 0.5 wt % to 3.0 wt % of an overall composition.

In certain aspects, the formulation comprises benzhetonium chloride at a concentration ranging from 0.01 wt % to 10 wt % of an overall composition.

In certain aspects, the formulation comprises sodium pyrithione at a concentration ranging from 0.001 wt % to 10 wt % of an overall composition. In certain aspects, the sodium pyrithione is at a concentration ranging from 0.1 wt % to 3.5 wt % of an overall composition, and more preferably at a concentration ranging from 0.5 wt % to 3.0 wt % of an overall composition.

In certain aspects, the antimicrobial formulation comprises at least two of sodium pentaborate, di-sodium tetraborate decahydrate, titanium diborite, titanium borate, sodium pyrithione, zinc pyrithione, and/or benzhetonium chloride.

In certain aspects, the antimicrobial formulation comprises at least three of sodium pentaborate, di-sodium tetraborate decahydrate, titanium diborite, titanium borate, sodium pyrithione, zinc pyrithione, and/or benzhetonium chloride.

In certain aspects, the antimicrobial formulation comprises at least four of sodium pentaborate, di-sodium tetraborate decahydrate, titanium diborite, titanium borate, sodium pyrithione, zinc pyrithione, and/or benzhetonium chloride.

In certain aspects, the antimicrobial formulation comprises at least five of sodium pentaborate, di-sodium tetraborate decahydrate, titanium diborite, titanium borate, sodium pyrithione, zinc pyrithione, and/or benzhetonium chloride.

In certain aspects, the antimicrobial formulation comprises at least six of sodium pentaborate, di-sodium tetraborate decahydrate, titanium diborite, titanium borate, sodium pyrithione, zinc pyrithione, and/or benzhetonium chloride.

In certain aspects, the antimicrobial formulation comprises at least seven of sodium pentaborate, di-sodium tetraborate decahydrate, titanium diborite, titanium borate, sodium pyrithione, zinc pyrithione, and/or benzhetonium chloride.

In certain aspects, the antimicrobial formulation reduces antimicrobial activity of *Escherichia coli*, *Staphylococcus aureus*, *Pseudomonas aeruginosa*, *Klebsiella pneumoniae*, Methicillin-resistant *Staphylococcus aureus* (MRSA), *Salmonella typhi*, Vancomycin-resistant *Enterococcus* (VRE) when contacted therewith.

In certain aspects, the antimicrobial formulation further comprises antifungal activity in which the formulation reduces *Candida albicans* activity.

Also disclosed are personal care products, disposable gloves, child or adult diapers, bandages, wound dressings, or gauze comprising the antimicrobial formulation disclosed herein.

Also disclosed are concrete, plaster, wood, paint, plastic, partial plastic, wood, glass, metal, glass, leather, fabric or paper comprising the disclosed antimicrobial formulation included therein or coated thereon.

Also disclosed is an aerosol coating material or non-aerosol coating material comprising the disclosed antimicrobial formulation. In certain aspects, the coating material is a non-aerosol coating material comprising paint having the antimicrobial formulation included therein.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

Figure 1A:
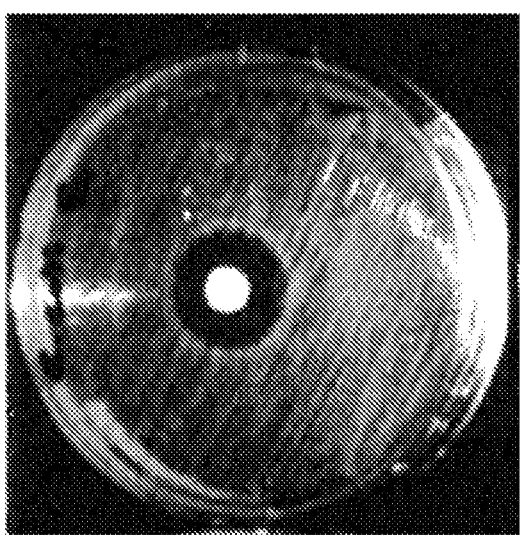
FIGS. 1A, 1B, 1C, 1D, 1E, and 1F show images of the antimicrobial effects of the formulation on *Escherichia coli*.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise.

"Optional" or "optionally" means that the subsequently described event or circumstance can or cannot occur, and that the description includes instances where the event or circumstance occurs and instances where it does not.

As used herein, the term "about" is used to provide flexibility to a numerical range endpoint by providing that a given value may be "slightly above" or "slightly below" the endpoint without affecting the desired result.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

The compositions and methods described herein can comprise, consist of, or consist essentially of the essential elements and limitations described herein, as well as any additional or optional ingredients, components, or limitations described herein.

It should be noted that the Figures, Working Examples, and Detailed Description include numerous abbreviations therein. These abbreviations are as follows: sodium pentaborate (SPO), di-sodium tetraborate decahydrate (DSTD), titanium diborite (TD), titanium borate (TB), sodium pyrithione (SP), zinc pyrithione (CP), benzhetonium chloride (BK).

Figure 1B:
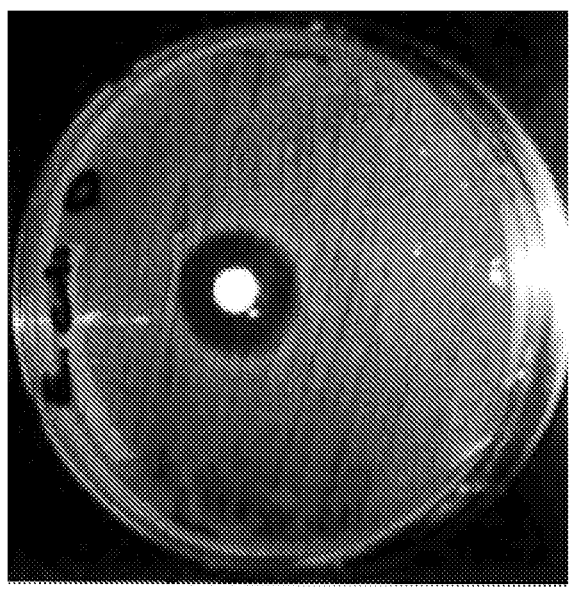
Figure 1C:
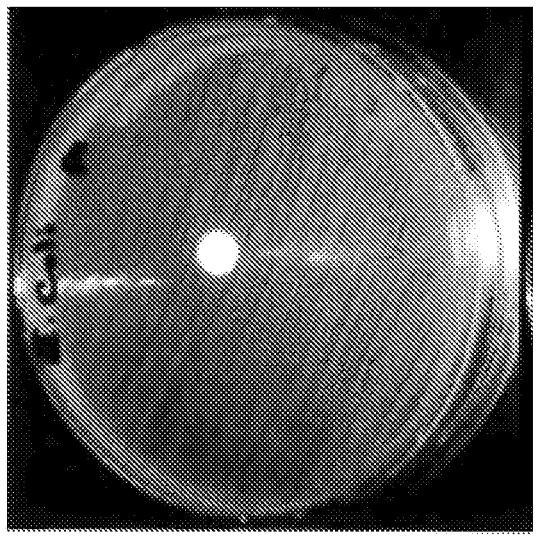
Figure 1D:
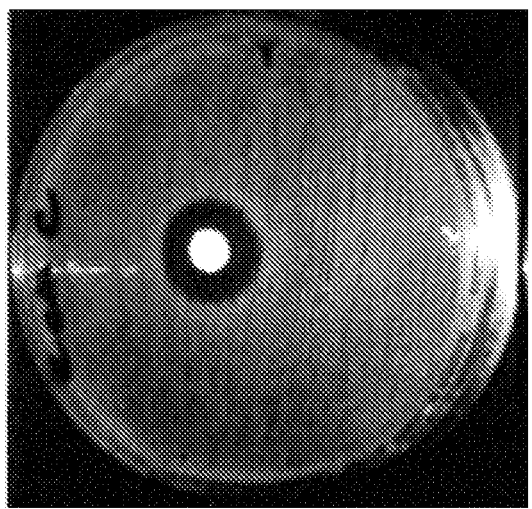
Figure 1F:
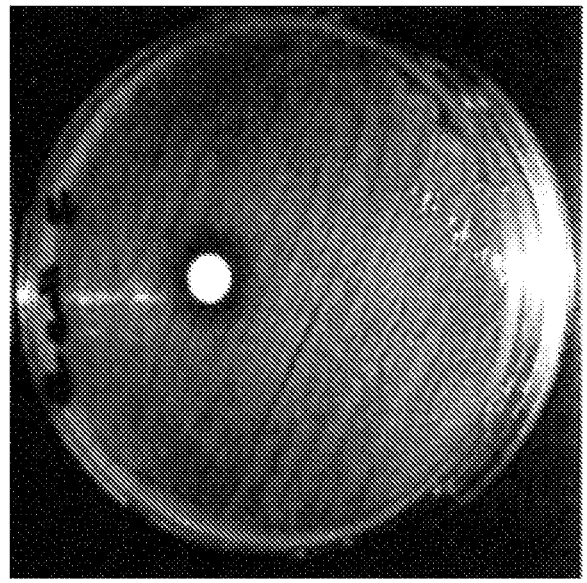
Figure 1E:
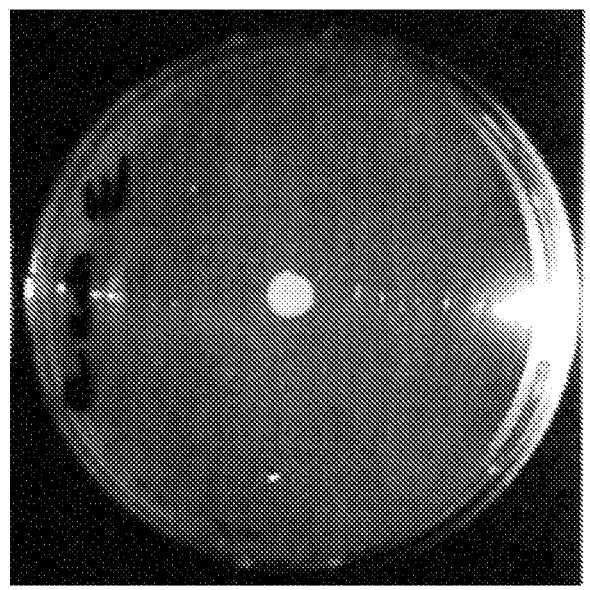
Figure 2A:
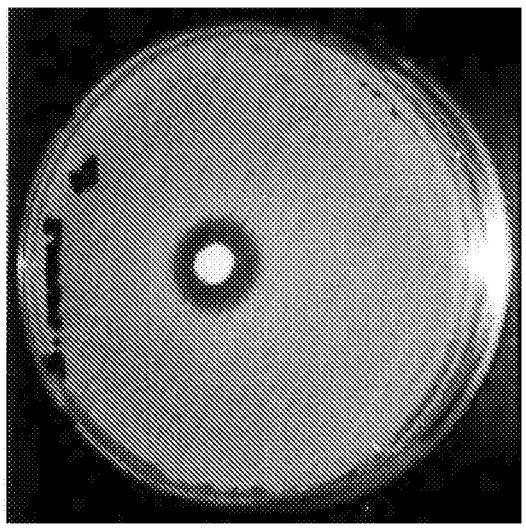
FIGS. 2A, 2B, 2C, 2D, 2E, and 2F show images of the antimicrobial effects of the formulation on *Staphylococcus aureus*.
Figure 2B:
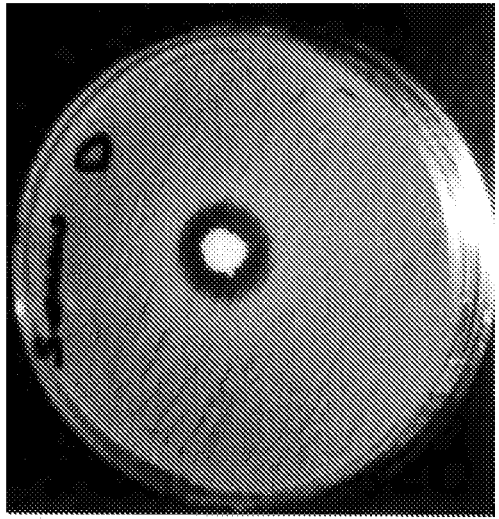
Figure 2C:
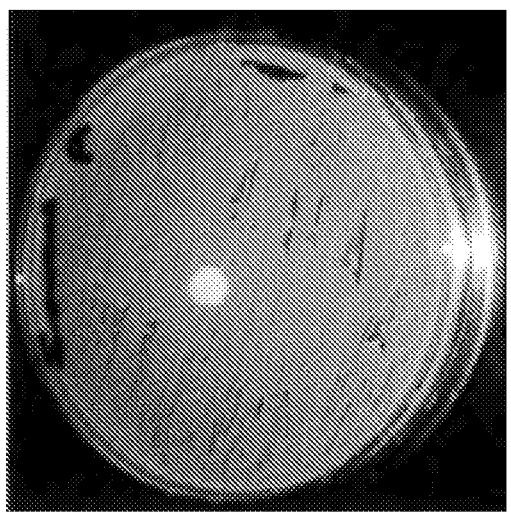
Figure 2D:
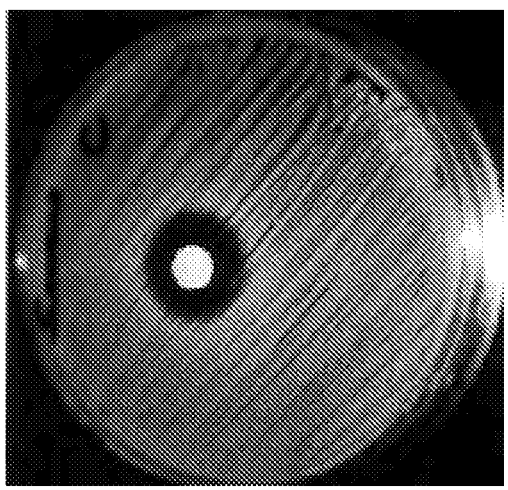
Figure 2F:
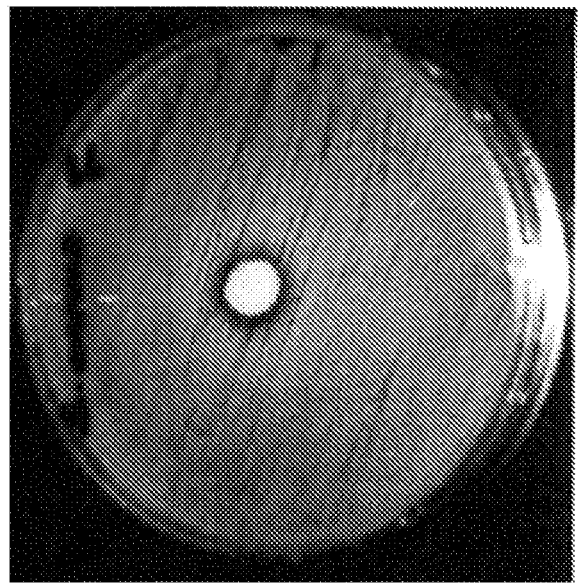
Figure 2E:
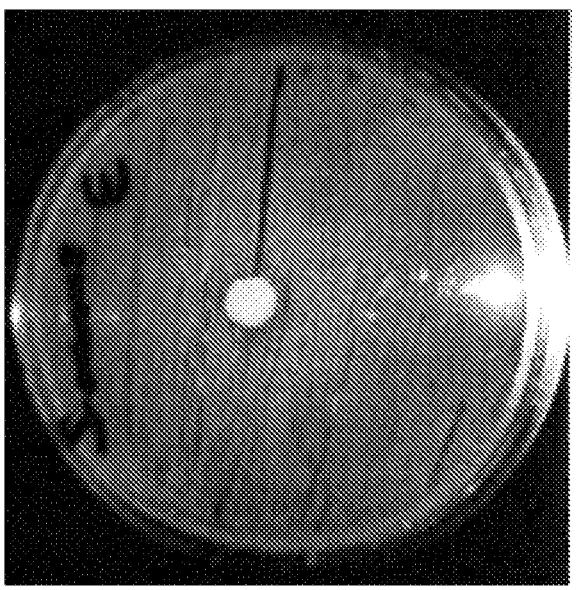
Figure 3A:
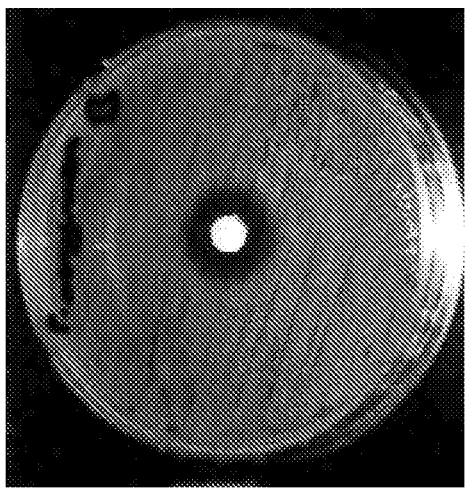
FIGS. 3A, 3B, 3C, 3D, 3E, and 3F show images of the antimicrobial effects of the formulation on *Pseudomonas aeruginosa*.
Figure 3B:
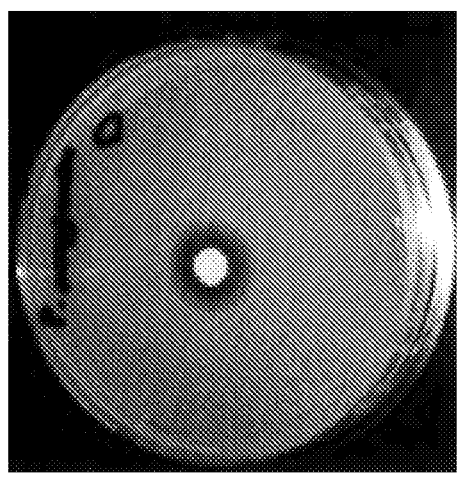
Figure 3C:
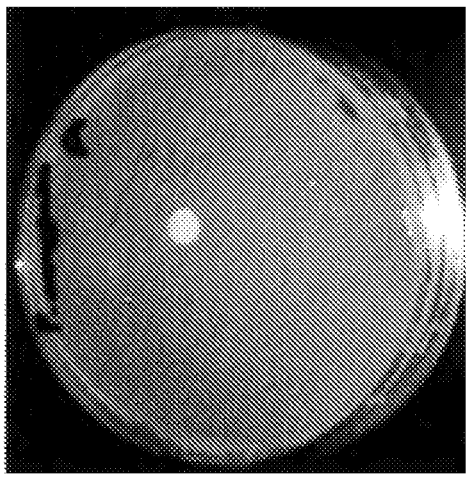
Figure 3D:
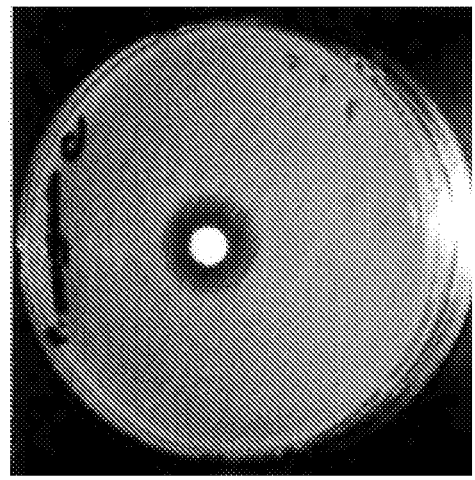
Figure 3F:
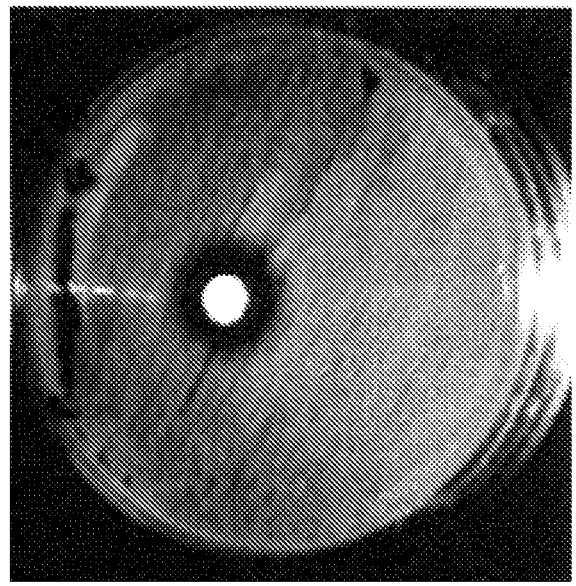
Figure 3E:
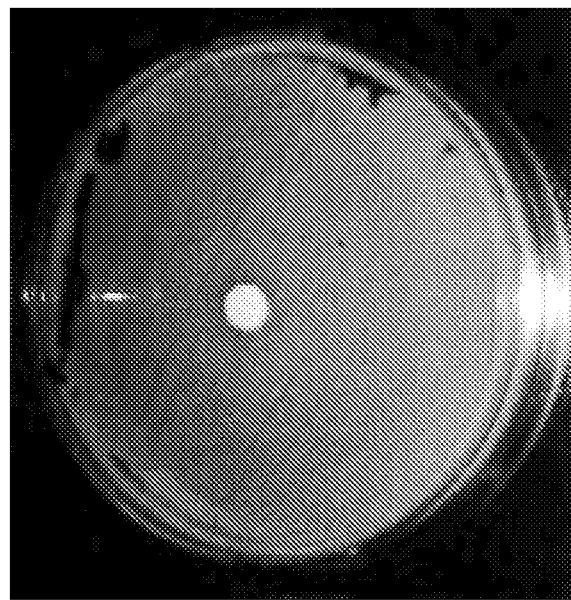
Figure 4B:
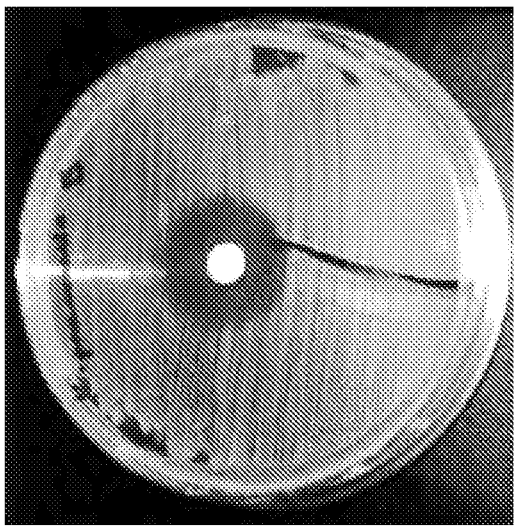
FIGS. 4A, 4B, 4C, 4D, 4E, and 4F show images of the antimicrobial effects of the formulation on *Klebsiella pneumoniae*.
Figure 4D:
Figure 4A:
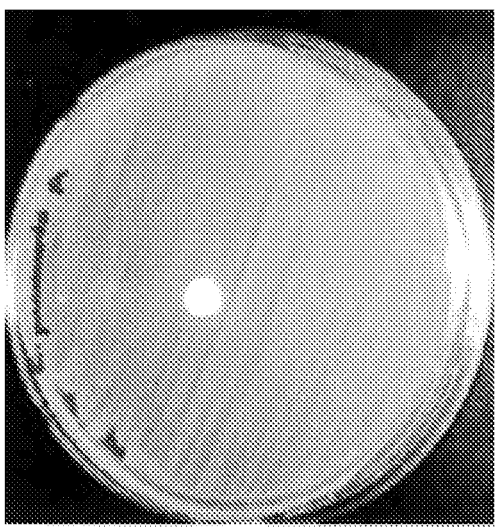
Figure 4C:
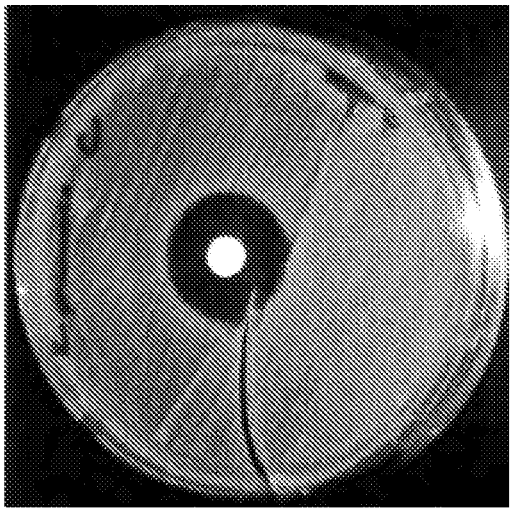
Figure 4F:
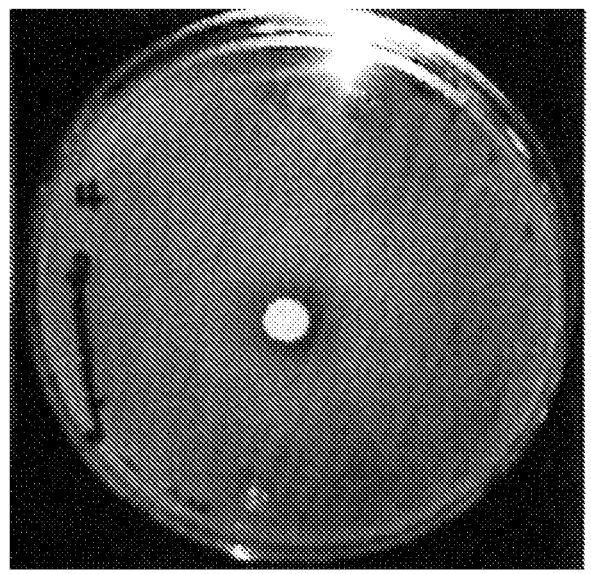
Figure 4E:
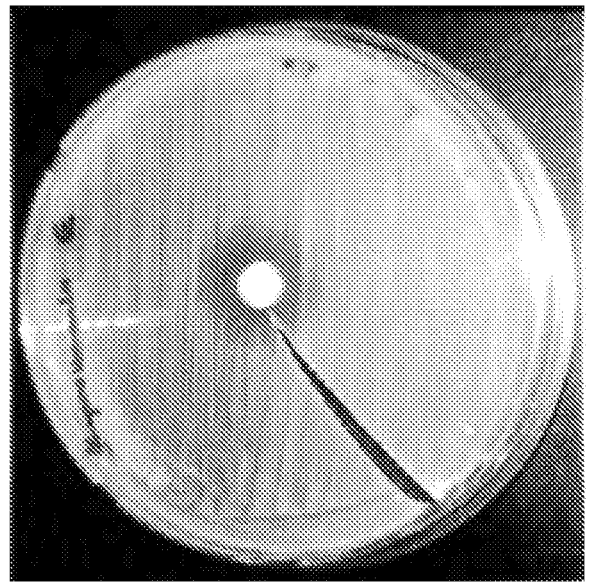
Figure 5A:
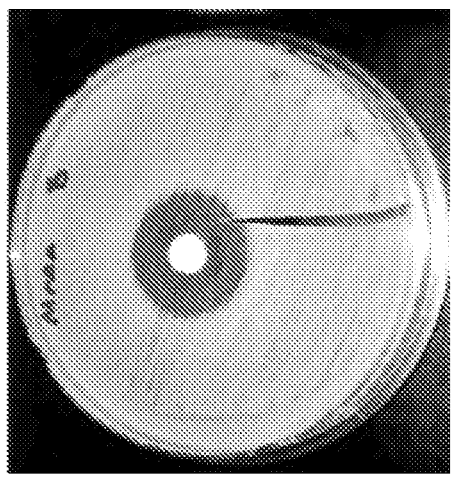
FIGS. 5A, 5B, 5C, 5D, 5E, and 5F show images of the antimicrobial effects of the formulation on Methicillin-Resistant *Staphylococcus aureus* (MRSA).
Figure 5B:
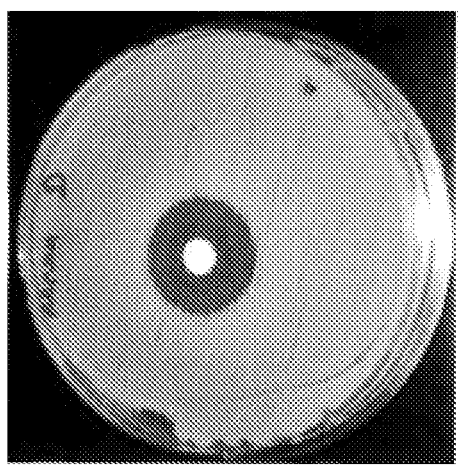
Figure 5C:
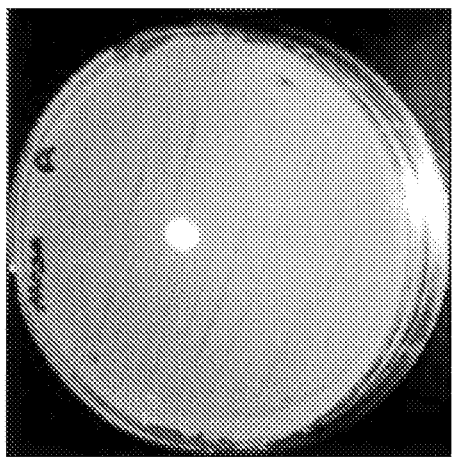
Figure 5D:
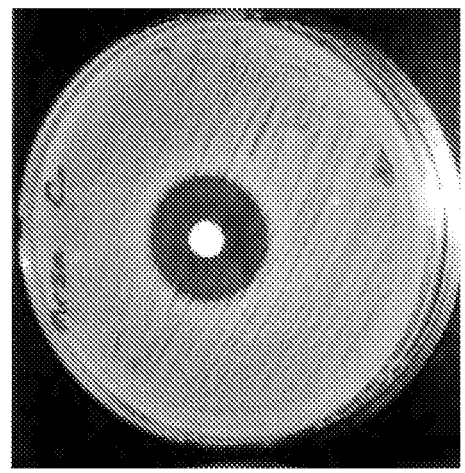
Figure 5F:
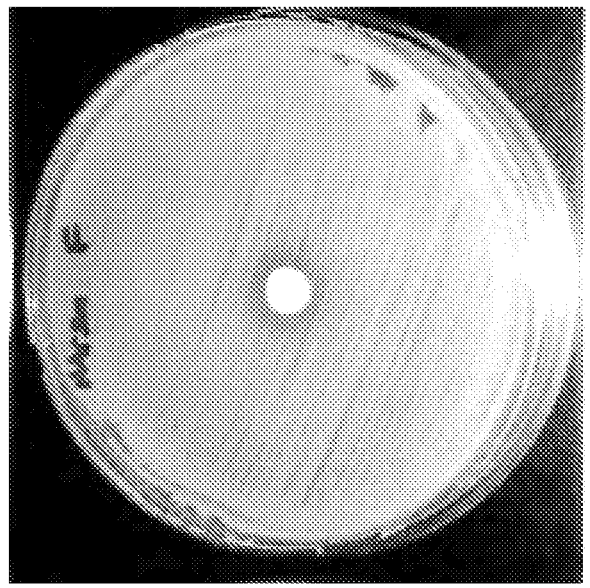
Figure 5E:
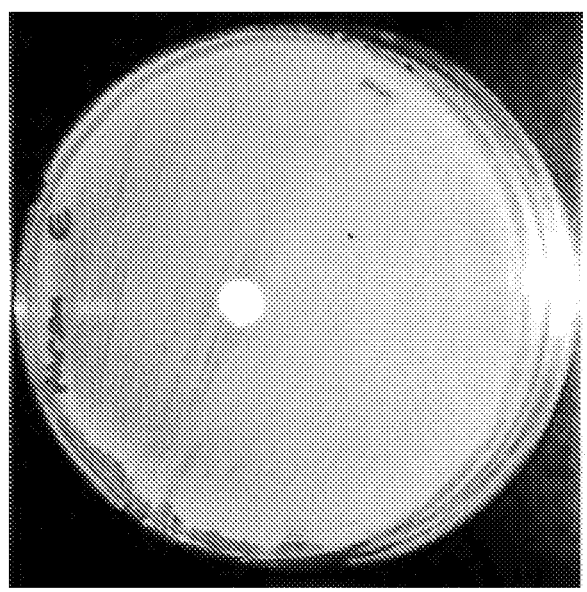
Figure 6A:
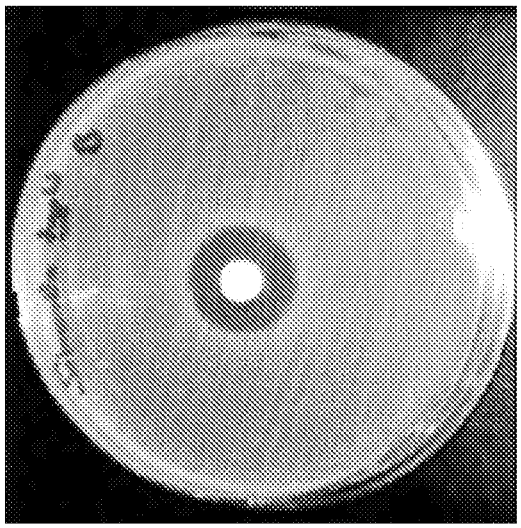
FIGS. 6A, 6B, 6C, 6D, 6E, and 6F show images of the antimicrobial effects of the formulation on *Salmonella typhi*.
Figure 6B:
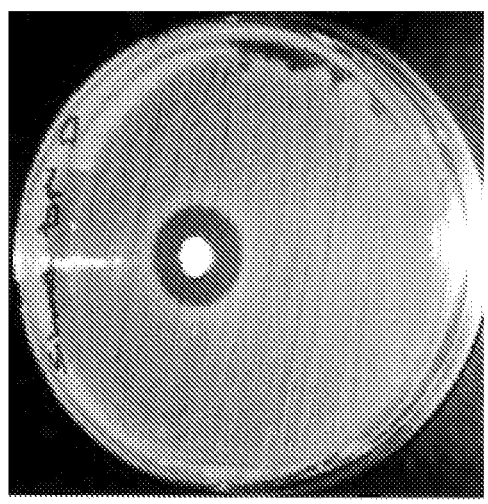
Figure 6C:
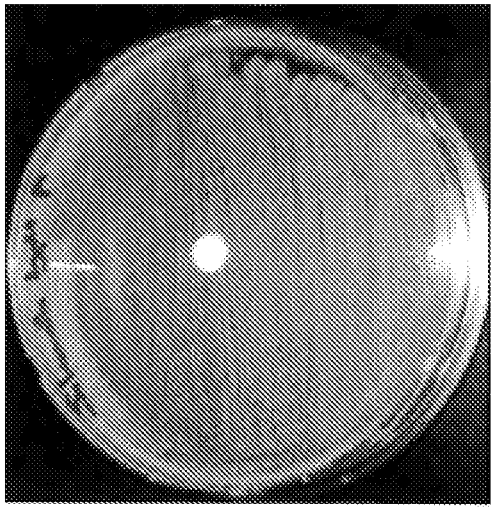
Figure 6D:
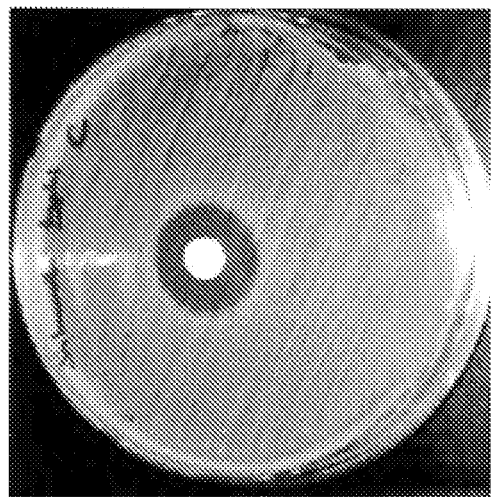
Figure 6F:
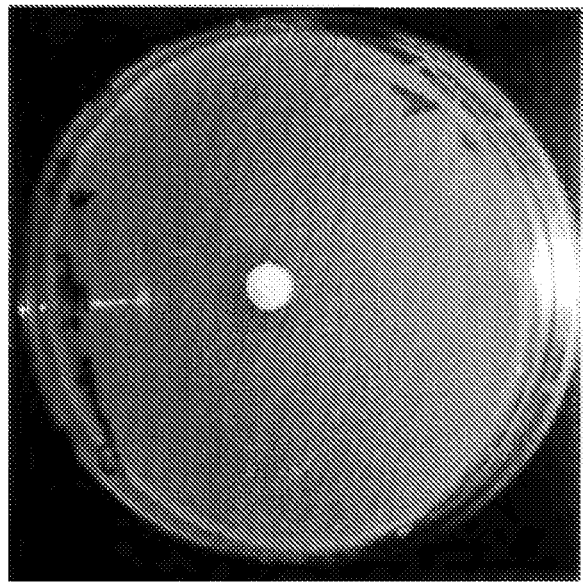
Figure 6E:
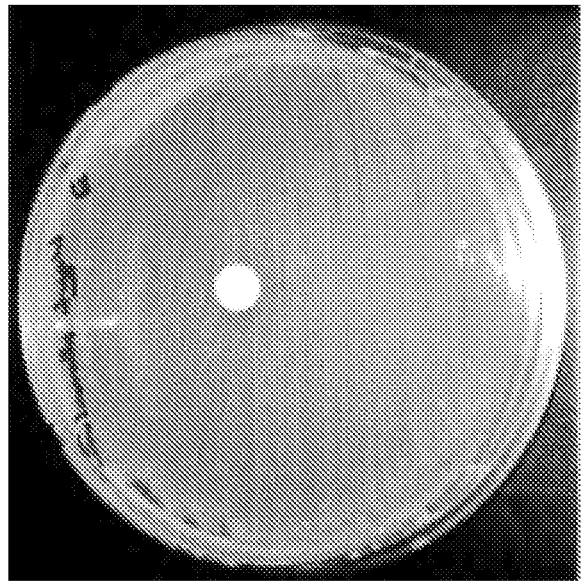
Figure 7A:
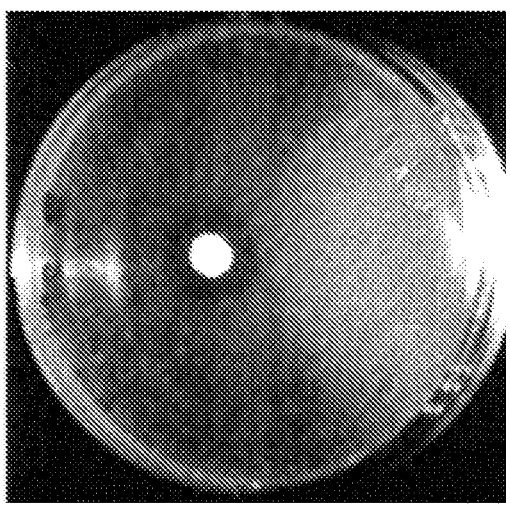
FIGS. 7A, 7B, 7C, 7D, 7E, and 7F show images of the antimicrobial effects of the formulation on Vancomycin-resistant *Enterococcus* (VRE).
Figure 7B:
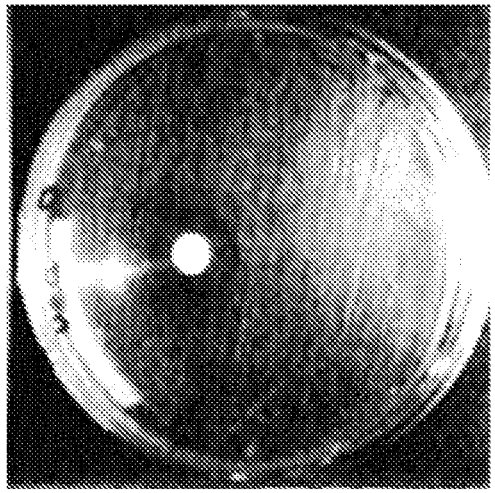
Figure 7C:
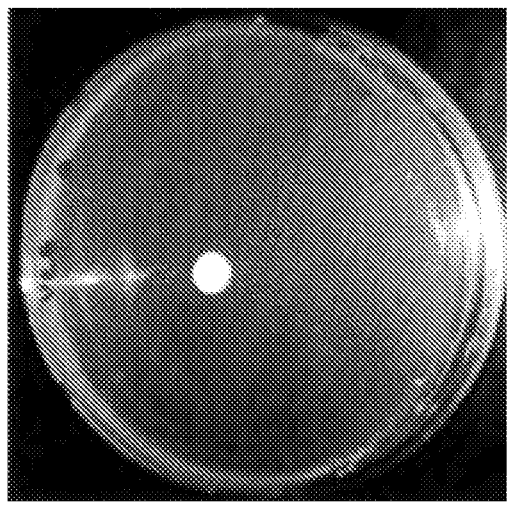
Figure 7D:
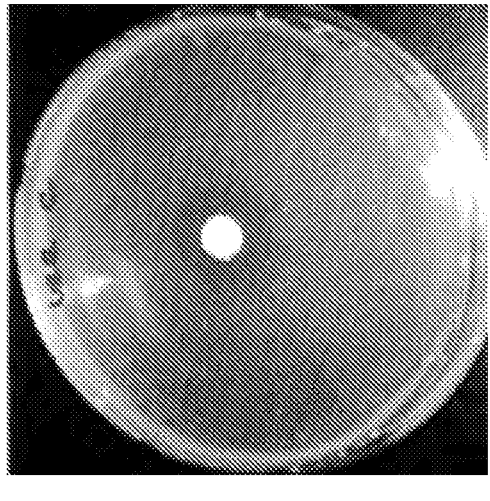
Figure 7F:
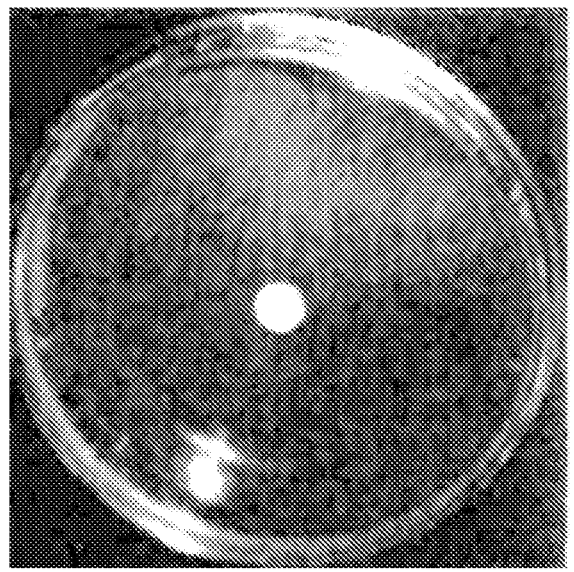
Figure 7E:
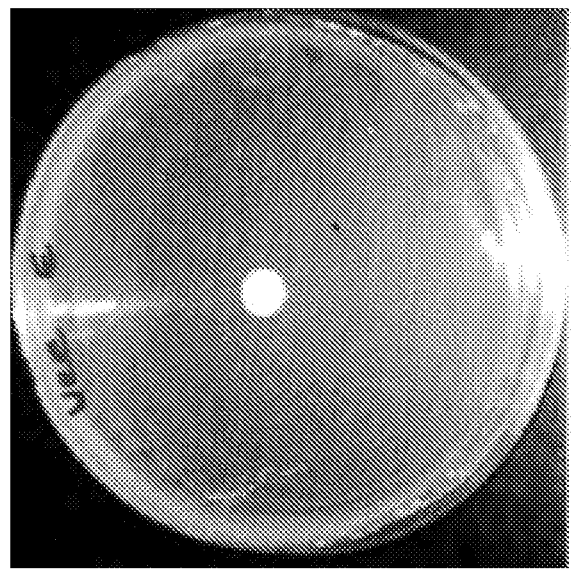
Figure 8A:
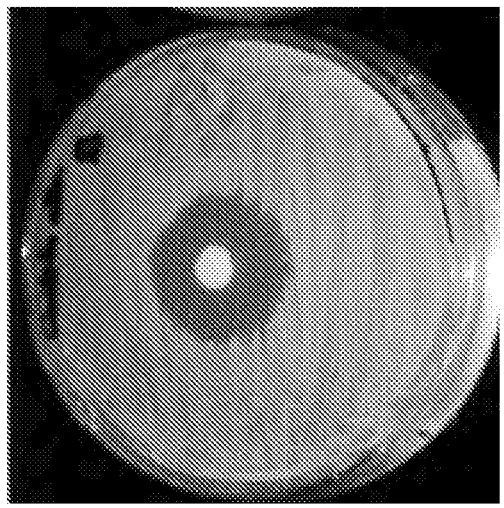
FIGS. 8A, 8B, 8C, 8D, 8E, and 8F show images of the antimicrobial effects of the formulation on *Candida albicans*.
Figure 8B:
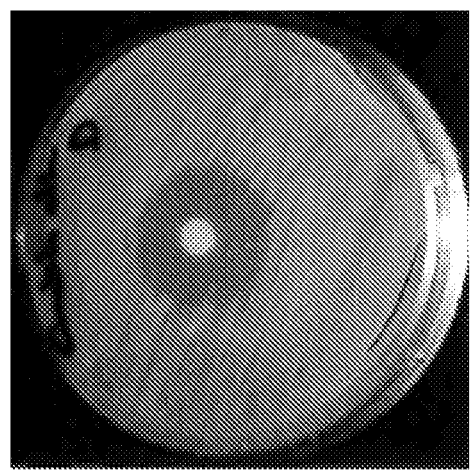
Figure 8C:
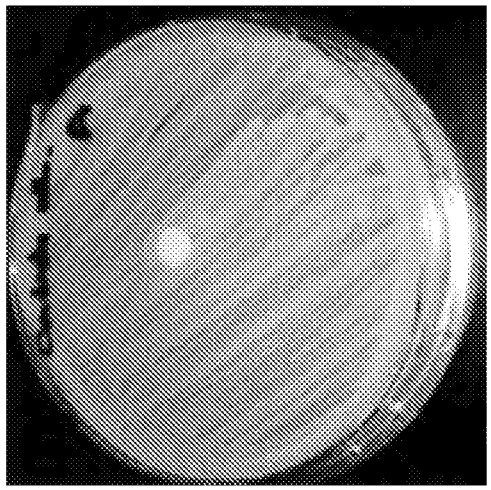
Figure 8D:
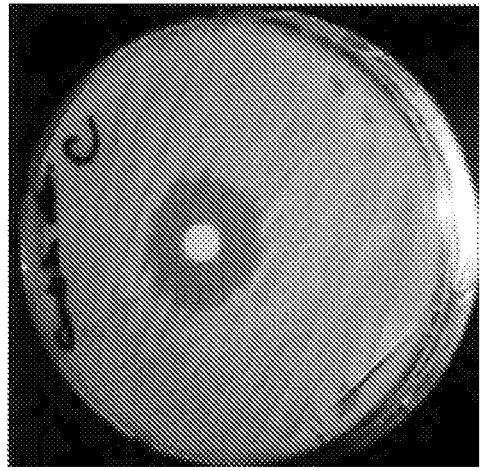
Figure 8F:
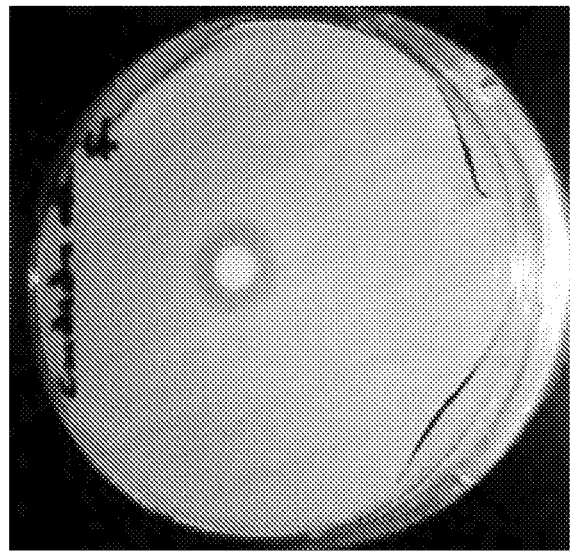
Figure 8E:
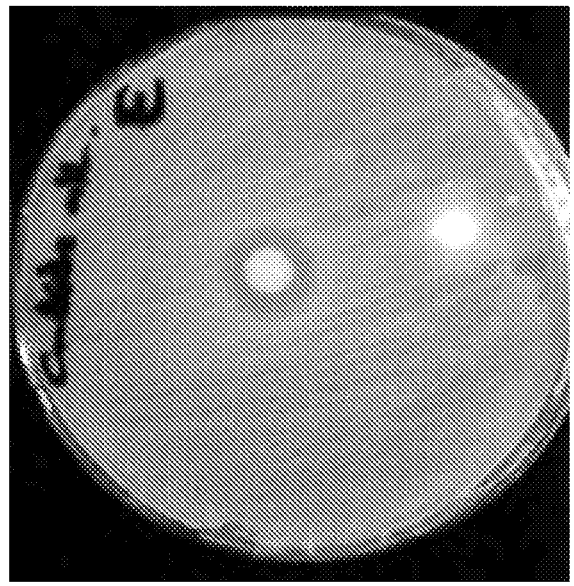
Figure 9A:
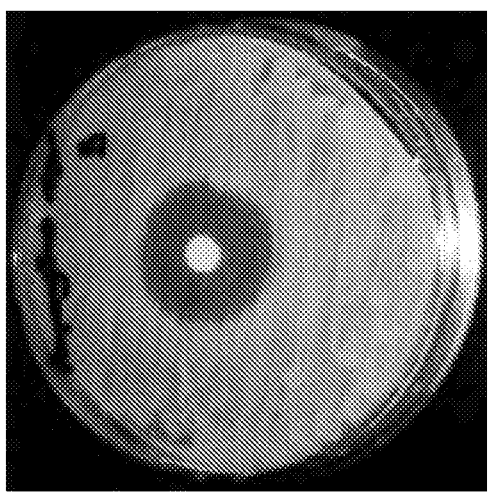
FIGS. 9A, 9B, 9C, 9D, 9E, and 9F show images of the antimicrobial effects of the formulation on *Aspergillus niger*.
Figure 9B:
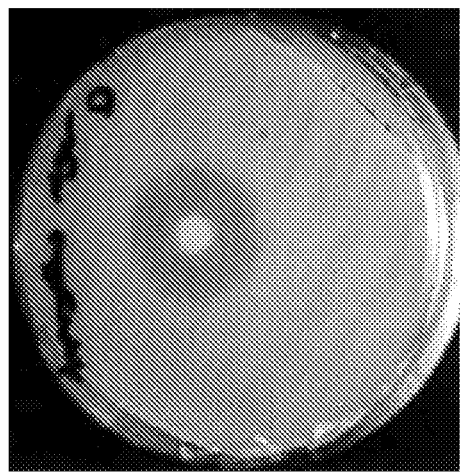
Figure 9C:
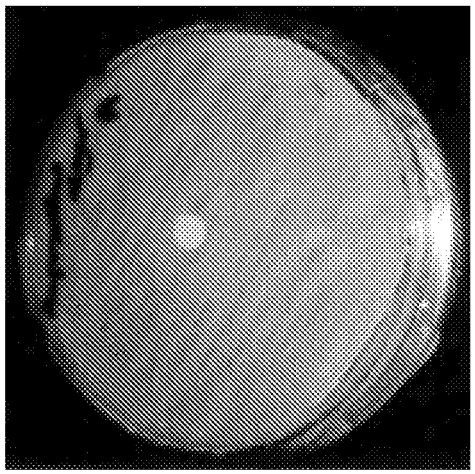
Figure 9D:
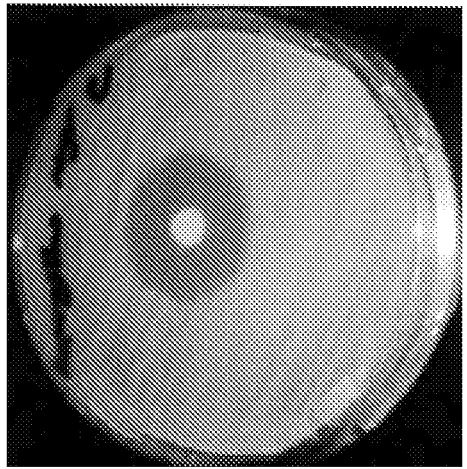
Figure 9F:
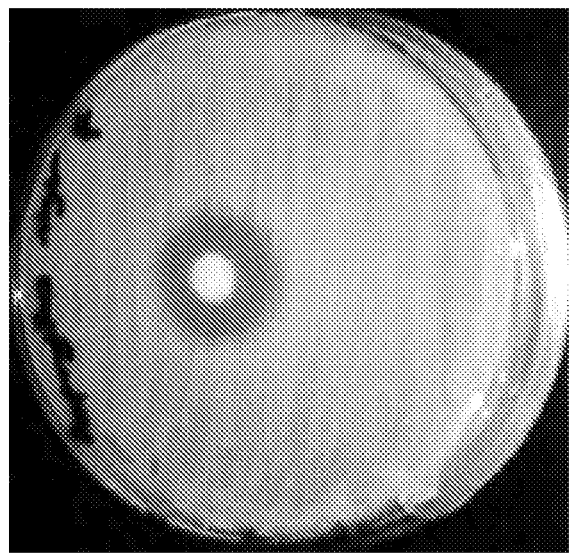
Figure 9E:

In view of FIGS. 1A-9F, it should be further noted that the abbreviations shown on the petri dishes include the below listed formulations:

A: negative control (addition free paint)
B: 0.75 wt % zinc pyrithione (CP)+3 wt % sodium pentaborate (SPO)+96.25 wt % paint
C: 0.5 wt % zinc pyrithione (CP)+3 wt % sodium pentaborate (SPO)+96.5 wt % paint
D: 0.2 wt % zinc pyrithione (CP)+3 wt % sodium pentaborate (SPO)+96.8 wt % paint
E: 3 wt % sodium pentaborate (SPO)+97 wt % paint
F: 5 wt % sodium pentaborate (SPO)+95 wt % paint Disclosed are antimicrobial formulations that include boron containing compounds, zinc containing compounds, and/or chlorine containing compounds that are configured to be included within and impart antimicrobial, anti-viral, and/or anti-fungal activity to coating compositions such as paints (e.g., water-based or oil based paints), rosins and/or to be included on a surface of various personal care products such as disposal gloves, child or adult diapers, bandages, wound dressings, gauzes bandages, concrete, plasterboards, wood, plastic(s) (e.g., PVC materials) or partial plastics, glass, metal, plaster, leather, fabric(s), or paper to directly impart antimicrobial, anti-viral, and/or anti-fungal activity. In certain other aspects, each of the boron containing compounds, zinc containing compounds, and/or chlorine containing compounds disclosed herein may be included within a surface coating to further impart antimicrobial, anti-viral, and/or anti-fungal activity to a composition and/or device.

The specific boron containing compounds disclosed herein are sodium pentaborate at a concentration ranging from 1 wt % to 20 wt % of the composition, di-sodium tetraborate decahydrate at a concentration ranging from 1 wt % to 20 wt % of the composition, titanium diborite at a concentration ranging from 1 wt % to 20 wt % of the composition, and titanium borate at a concentration ranging from 1 wt % to 20 wt % of the composition. In certain aspects, at least one of the above boron containing compounds is included within the coating compositions disclosed herein and/or applied on the surface of the personal care products such as disposal gloves, child or adult diapers, bandages, wound dressings, gauzes bandages, concrete, plasterboards, wood, plastic(s) (e.g., PVC materials) or partial plastics, glass, metal, plaster, leather, fabric(s), or paper to directly impart antimicrobial activity. In certain aspects, at least two of the above boron containing compounds mentioned immediately above are included within the coating compositions disclosed herein and/or applied on the surface of the personal care products such as disposal gloves, child or adult diapers, bandages, wound dressings, gauzes bandages, concrete, plasterboards, wood, plastic(s) (e.g., PVC materials) or partial plastics, glass, metal, plaster, leather, fabric(s), or paper to directly impart antimicrobial activity. In certain aspects, at least three of the above boron containing compounds mentioned immediately above are included within the coating compositions disclosed herein and/or applied on the surface of the personal care products such as disposal gloves, child or adult diapers, bandages, wound dressings, gauzes bandages, concrete, plasterboards, wood, plastic(s) (e.g., PVC materials) or partial plastics, glass, metal, plaster, leather, fabric(s), or paper to directly impart antimicrobial activity. In certain aspects, all four of the above boron containing compounds mentioned immediately above are included within the coating compositions disclosed herein and/or applied on the surface of the personal care products such as disposal gloves, child or adult diapers, bandages, wound dressings, gauzes bandages, concrete, plasterboards, wood, plastic(s) (e.g., PVC materials) or partial plastics, glass, metal, plaster, leather, fabric(s), or paper to directly impart antimicrobial activity. In certain aspects, sodium pentaborate is present at a concentration ranging from 3 wt % to 12 wt % of an overall composition, and more preferably from 5 wt % to 10 wt % of the overall composition. In certain aspects, sodium di-sodium tetraborate decahydrate is present at a concentration ranging from 3 wt % to 12 wt % of an overall composition, and more preferably from 5 wt % to 6 wt % of the overall composition.

In certain aspects, the zinc containing compound disclosed herein is zinc pyrithione at a concentration ranging from 0.005 wt % to 10 wt % of the composition. In certain aspects, the zinc pyrithione is at a concentration ranging from 0.1 wt % to 3.5 wt % of an overall composition, and more preferably at a concentration ranging from 0.5 wt % to 3.0 wt % of an overall composition. In certain aspects, the zinc containing compound disclosed herein may be combined with one, two, three, or all four of the boron containing compounds disclosed herein to achieve the coating compositions, rosins, personal care products, etc. disclosed herein having antimicrobial, anti-viral, and/or anti-fungal activity.

In certain aspects, the chlorine containing compounds disclosed herein is benzethonium chloride ranging from 0.01 wt % to 10 wt % of the composition. In certain aspects, the chlorine containing compound disclosed herein may be combined with the zinc containing compound (zinc pyrithione) disclosed herein and/or any of one, two, three, or all four of the boron containing compounds disclosed herein to achieve the coating compositions, rosins, personal care products, etc. disclosed herein having antimicrobial, anti-viral, and/or anti-fungal activity.

In certain aspects, it is desirable to prepare polymeric composites, which have antimicrobial and/or anti-viral activity. In this aspect and when preparing the polymeric composite, the polymeric composite will preferably include zinc pyrithione at concentration ranging from 0.005 wt % to 10 wt % of the overall composition and benzethonium chloride at a concentration ranging from 0.001 wt % to 10 wt % of the overall composition, preferably homogeneously mixed and/or dispersed therein to provide antimicrobial and/or antiviral activity to the polymeric composites.

In certain aspects, the formulation comprises sodium pyrithione at a concentration ranging from 0.001 wt % to 10 wt % of an overall composition. In certain aspects, the sodium pyrithione is at a concentration ranging from 0.1 wt % to 3.5 wt % of an overall composition, and more preferably at a concentration ranging from 0.5 wt % to 3.0 wt % of an overall composition. In certain additional aspects and when preparing the polymeric composite, the polymeric composite will preferably include sodium pyrithione at a concentration ranging from 0.001 wt % to 10 wt % of the overall composition and di-sodium tetraborate decahydrate at a concentration ranging from 1 wt % to 20 wt % of the overall composition, preferably homogeneously mixed and/or dispersed therein to provide antimicrobial and/or antiviral activity to the polymeric composites.

In certain additional aspects, also disclosed are formulations having sodium pyrithione at a concentration ranging from 0.1 wt % to 0.3 wt % of the overall composition and sodium pentaborate at a concentration ranging from 3 wt % to 11 wt % of the overall composition and more preferably sodium pyrithione at a concentration ranging from 0.1 wt % to 0.3 wt % of the overall composition and sodium pentaborate at a concentration ranging from 5 wt % to 10 wt % of the overall composition.

In certain additional aspects, also disclosed are formulations having sodium pyrithione at a concentration ranging from 0.1 wt % to 0.3 wt % of the overall composition and disodium tetraborate decahydrate at a concentration ranging from 5 wt % to 10 wt % of the overall composition and more preferably sodium pyrithione at a concentration ranging from 0.1 wt % to 0.3 wt % of the overall composition and disodium tetraborate decahydrate at a concentration ranging from 5 wt % to 6 wt % of the overall composition.

In certain additional aspects, also disclosed are formulations having zinc pyrithione at a concentration ranging from 0.1 wt % to 3.0 wt % of the overall composition and sodium pentaborate at a concentration ranging from 3 wt % to 11 wt % of the overall composition and more preferably zinc pyrithione at a concentration ranging from 0.1 wt % to 0.3 wt % of the overall composition and sodium pentaborate at a concentration ranging from 5 wt % to 10 wt % of the overall composition.

In certain additional aspects, also disclosed are formulations having zinc pyrithione at a concentration ranging from 0.1 wt % to 3.0 wt % of the overall composition and disodium tetraborate decahydrate at a concentration ranging from 3 wt % to 11 wt % of the overall composition and more preferably zinc pyrithione at a concentration ranging from 0.1 wt % to 0.3 wt % of the overall composition and disodium tetraborate decahydrate at a concentration ranging from 5 wt % to 10 wt % of the overall composition.

WORKING EXAMPLES

Experimental Studies

In this application; boron compounds, sodium pyrithione, zinc pyrithione, benzhetonium chloride and combinations are mixed with paint and similar coating materials separately or with different combinations and concentrations to obtain coatings and/or coating formulations having antimicrobial properties. In particular, sodium pentaborate, di-sodium tetraborate decahydrate, titanium diborate, titanium borate were chosen as boron containing compounds that impart antimicrobial activity to these coatings and coating formulations.

Antimicrobial Tests
Modified Disc Diffusion Method;

In view of FIGS. 1A-9F, standard NCCLS disc diffusion method [8] was modified and used to determine the activity on microorganisms of boron compounds. 108 cfu/ml bacteria, 106 cfu/ml yeast and 104 spore/ml mold cultures were prepared and applied as spreading inoculation on Nutrient Agar (NA), Sabouraud Dextrose Agar (SDA) and Potato Dextrose Agar (PDA). 20 µl sterilized water dripped on empty discs and discs were immersed into sodium pentaborate (SPO), di-sodium tetraborate decahydrate (DSTD), zinc pyrithione (CP) separately. SPO, DSTD, CP coded discs placed on inoculated petri dishes. As negative control, 20 µl sterilized water dripped petri dishes were used. As positive controls, Ofloxacin (10 µg/disc) and nystatin (30 µg/disc) contaminated discs were used for bacteria and fungus. Modified and inoculated discs were incubated for bacteria 24 hours at 37±1° C. for yeast 48 hours 36±1° C., mold 72 hours 25±1° C. Antimicrobial activity inhibition zone observed and evaluated for the test microorganisms.

All tests were repeated at least 2 times. Antimicrobial activity test results are shown in Table 1.
Antimicrobial Activity Tests of Developed Antimicrobially Activated Substance:

Applied modified disc diffusion methods' formulations were tested to measure antimicrobial activities.
Experimental Results Given in Table 2.
Antimicrobial Surface Activity Tests for Antimicrobial Ingredients:

ISO 22196:2011(E) test method was applied to test the antibacterial surface activities. Coating material including 0.75 wt % zinc pyrithione (CP)+3 wt % sodium pentaborate (SPO)+95.44 wt % paint, applied on plastic surface 50 mm×50 mm dimension and hold 24 hours to dry. *Staphylococcus aureus* ATCC 6538P, *Escherichia coli* ATCC 8739, Methicillin-resistant *S. aureus* (MRSA) ATCC 43300, *Pseudomonas aeruginosa* ATCC 15442, *Klebsiella pneumoniae* ATCC #4352 strains were used in antimicrobial activity tests. Initial concentrations of test microorganisms set up as 2.5-10×10$^5$ cfu/ml. Control sample was tested at Time: 0 and Time: 24 and this was repeated three times. Developed paint surface were tested at 24th hour and the test repeated three times. Each sample were placed into petri dishes and inoculated. 40 mm×40 mm×0.05 mm sterilized plastics were capped in petri dish to attach and spread the inoculate. Samples incubated at 35° C. and 90% relative humidity.

End of incubation (24 h) D/E Neutralizing Broth was added to each sample and shaken for a specific time. Neutralizing Broth serially diluted samples inoculated in Nutrient Agar petri dishes and incubated at 35° C. and 24-48 hours.

Counting Results are Given in Table 3.

Application 1: 0.78 g (of 48% pure) zinc pyrithione, 1.5 g sodium pentaborate and 47.72 g water based paint were mixed and homogenized for 50 g antimicrobial paint mixture. Produced paint mixture was tested for antimicrobial activity.

Application 2: 0.52 g (of 48% pure) zinc pyrithione, 1.5 g sodium pentaborate and 47.98 g of water based paint were mixed and homogenized for 50 g of antimicrobial paint mixture. Produced paint mixture was tested for antimicrobial activity.

Application 3: 0.2 g (of 48% pure) zinc pyrithione, 1.5 g sodium pentaborate and 48.3 g water based paint were mixed and homogenized for 50 g of antimicrobial paint mixture. Produced paint mixture was tested for antimicrobial activity.

Application 4: 1.5 g sodium pentaborate and 48.5 g water based paint were mixed and homogenized for 50 g of antimicrobial paint mixture. Produced paint mixture was tested for antimicrobial activity.

Application 5: 2.5 g sodium pentaborate and 47.5 g water based paint were mixed and homogenized for 50 g of antimicrobial paint mixture. Produced paint mixture was tested for antimicrobial activity.

Experimental Results

Antimicrobial Test Results:

Antimicrobial activity test results are given in Table 1. All tests were repeated twice.

TABLE 1

Antimicrobial effect of Sodium Pentaborate (SPO), di-sodium tetraborate decahydrate (DSTD), Zinc pyrithione (CP) on selected microorganisms.

| Microorganisms | Compounds | | |
|---|---|---|---|
| | SPO | DSTD | CP |
| Bacteria | | | |
| Escherichia coli | + | + | + |
| Staphylococcus aureus | + | + | + |
| Pseudomonas aeruginosa | + | + | + |
| Klebsiella pneumoniae | + | + | + |
| Methicillin-resistant Staphylococcus aureus (MRSA) | + | + | + |
| Salmonella typhi | + | + | + |
| Vancomycin-resistant Enterococcus (VRE) | + | + | + |
| Yeast | | | |
| Candida albicans | + | + | + |
| Mold | | | |
| Aspergillus spp. | + | + | + |
| Penicillium spp. | + | + | + |

Antimicrobial activity test results of antimicrobial effective formulas are given in Table 2. All tests were repeated twice. Visuals of antimicrobial tests are given in FIGS. 1A-9F.

TABLE 2

Antimicrobial effect of active including paint mixtures on microorganisms.

| | A[1] | B[2] | C[3] | D[4] | E[5] | F[6] |
|---|---|---|---|---|---|---|
| E. coli | − | + | + | + | − | + |
| S. aureus | − | + | + | + | + | + |
| P. aeruginosa | − | + | + | + | + | + |
| K. pneumoniae | − | + | + | + | + | + |
| MRSA | − | + | + | + | − | + |
| S. typhi | − | + | + | + | − | + |
| VRE | − | + | + | + | − | − |
| C. albicans | − | + | + | + | + | + |
| A. niger | − | + | + | + | + | + |

[1]A: Negative Control (Additive Free)
[2]B: %0.75 CP + %3 SPO + %96.25 Paint
[3]C: %0.5 CP + %3 SPO) + %96.5 Paint
[4]D: %0.2 CP + %3 SPO + %96.8 Paint
[5]E: %3 SPO + %97 Paint
[6]F: %5 SPO + %95 Paint Antimicrobial activities were tested on isolates of bacteria (*Escherichia coli, Staphylococcus aureus, Pseudomonas aeruginosa, Klebsiella pneumoniae*, MRSA, *Salmonella typhi* ve VRE), mold (*Candida albicans*) and fungi (*Aspergillus niger* ve *Penicillium* spp.). According to the results, boron compounds and Zinc pyrithione paints and surfaces painted by these ingredients have antibacterial effect on all tested microorganisms. Antimicrobial activity tests are given in Table 3.

TABLE 3

Surface activity tests of B formulation applied plastic surfaces and control

| Microorganism | $U_0$[1] | $U_{24}$[2] | $A_{24}$[3] | R[4] | % Reduction[5] |
|---|---|---|---|---|---|
| Escherichia coli | 4.01 | 5.89 | −0.20 | 6.09 | 99.99992 |
| Staphylococcus aureus | 4.36 | 4.45 | −0.20 | 4.65 | 99.9980 |
| Pseudomonas aeruginosa | 4.14 | 5.60 | −0.20 | 5.80 | 99.9998 |
| Klebsiella pneumoniae | 4.24 | 5.24 | −0.20 | 5.44 | 99.9996 |
| MRSA | 4.04 | 5.14 | −0.20 | 5.34 | 99.9995 |

[1]$U_0$: t = 0 Logarithmical average of living bacteria on non-activated painted surface at t = 0 moment.
[2]$U_t$: t = 24 h Logarithmical average of living bacteria on non-activated painted surface at t = 24
[3]$A_{24}$: t = 24 Logarithmical average of living bacteria on antimicrobially painted surfaces at t = 24
[4]R: Antimicrobial activity calculation R = $(U_{24} - U_o) - (A_{24} - U_o) = U_{24} - A_{24}$
[5]% Reduction: Percentage decrease between living bacteria on antimicrobially painted surface at initial moment and final moment concentrations.

According to ISO 22196:2011 (E) test method, products having antibacterial activity (R) higher than 2/0 called antibacterial products. According to the test results given above (as an example B formulation results given), the developed product addible to coating material formulation may be called antibacterial product.

Reduction percentage can be converted into logarithmical reduction:

90% reduction=1 log reduction; from 1,000,000 to 100,000
99% reduction=2 log reduction; from 1,000,000 to 10,000
99.9% reduction=3 log reduction; from 1,000,000 to 1000
99.99% reduction=4 log reduction; from 1,000,000 to 100

99.999% reduction=5 log reduction; from 1,000,000 to 10
99.99999% reduction=6 log reduction; from 1,000,000 to 1

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

REFERENCES

1. Pritchard G (2012) Plastics additives: an AZ reference, vol 1. Springer Science & Business Media,
2. Tiwari A (2017) Handbook of antimicrobial coatings. Elsevier,
3. Preuss A, Stodden B, Peter W, Lin I-C (2010) Antimicrobial plastics and coatings. Google Patents,
4. Cook G S, Trebella M R (2017) Antimicrobial coating for inhibition of bacterial adhesion and biofilm formation. Google Patents,
5. Bailey P, Cousins G, Snow G, White A (1980) Boron-containing antibacterial agents: effects on growth and morphology of bacteria under various culture conditions. Antimicrobial agents and chemotherapy 17 (4):549-553
6. Imokawa G, Shimizu H (1982) Antimicrobial effect of zinc pyrithione.
7. Reeder N L, Kaplan J, Xu J, Youngquist R S, Wallace J, Hu P, Juhlin K D, Schwartz J R, Grant R A, Fieno A (2011) Zinc pyrithione inhibits yeast growth through copper influx and inactivation of iron-sulfur proteins. Antimicrobial agents and chemotherapy 55 (12):5753-5760
8. Lalitha M (2004) Manual on antimicrobial susceptibility testing. Performance standards for antimicrobial testing: Twelfth Informational Supplement 56238:454-456

What is claimed is:

1. A paint comprising:
an antimicrobial formulation, the antimicrobial formulation comprising,
di-sodium tetraborate decahydrate at a concentration ranging from 1 wt % to 20 wt %,
zinc pyrithione and/or sodium pyrithione at a concentration ranging from 0.005 wt % to 10 wt %, and
benzethonium chloride at a concentration ranging from 0.01 wt % to 10 wt %.

2. The paint of claim 1, wherein the antimicrobial formulation further comprises sodium pentaborate at a concentration ranging from 1 wt % to 20 wt %.

3. The paint of claim 1, wherein the antimicrobial formulation further comprises titanium diboride at a concentration ranging from 0.2 wt % to 20 wt %.

4. The paint of claim 1, wherein the antimicrobial formulation further comprises titanium borate at a concentration ranging from 0.2 wt % to 20 wt %.

5. The paint of claim 1, wherein the antimicrobial formulation further comprises sodium pyrithione at a concentration ranging from 0.001 wt % to 10 wt %.

6. The paint of claim 1, wherein the antimicrobial formulation further comprises at least one of sodium pentaborate, titanium diboride, titanium borate, or sodium pyrithione.

7. The paint of claim 1, wherein the antimicrobial formulation further comprises at least two of sodium pentaborate, titanium diboride, titanium borate, or sodium pyrithione.

8. The paint of claim 1, wherein the antimicrobial formulation further comprises at least three of sodium pentaborate, titanium diboride, titanium borate, or sodium pyrithione.

9. The paint of claim 1, wherein the antimicrobial formulation further comprises each of sodium pentaborate, titanium diboride, titanium borate, or sodium pyrithione.

10. The paint of claim 1, wherein the antimicrobial formulation reduces antimicrobial activity of *Escherichia coli*, *Staphylococcus aureus*, *Pseudomonas aeruginosa*, *Klebsiella pneumoniae*, Methicillin-resistant *Staphylococcus aureus* (MRSA), *Salmonella typhi*, Vancomycin-resistant *Enterococcus* (VRE) when contacted therewith.

11. The paint of claim 1, wherein the antimicrobial formulation further comprises antifungal activity in which the formulation reduces *Candida albicans* activity.

12. The paint of claim 1, wherein the paint is a non-aerosol.

* * * * *